United States Patent [19]

Bottesch et al.

[11] Patent Number: 5,166,681
[45] Date of Patent: Nov. 24, 1992

[54] PASSIVE VEHICLE PRESENCE DETECTION SYSTEM

[76] Inventors: H. Werner Bottesch, R.D. #6, Box 374, Danville, Pa. 17821; David A. Freas, P.O. Box 324, Mifflinville, Pa. 18631

[21] Appl. No.: 560,052

[22] Filed: Jul. 30, 1990

[51] Int. Cl.⁵ .............................................. G08G 1/04
[52] U.S. Cl. .................................... 340/933; 340/942; 340/901; 340/903; 340/436; 340/555; 180/167; 250/336.1
[58] Field of Search ............... 340/933, 942, 901, 903, 340/904, 436, 555, 556; 455/600, 603, 604; 342/27, 29, 41, 53; 180/167; 250/336.1

[56] References Cited

U.S. PATENT DOCUMENTS

| | | |
|---|---|---|
| 3,167,739 | 1/1965 | Girard et al. |
| 3,551,676 | 12/1967 | Runnels .................... 250/83.3 |
| 3,759,614 | 9/1973 | Harvey ........................ 356/4 |
| 3,972,021 | 7/1976 | Leitz et al. |
| 4,009,960 | 3/1977 | Feldman et al. ............ 356/1 |
| 4,195,425 | 4/1980 | Leitz et al. ................. 356/28 |
| 4,258,351 | 3/1981 | Shigeta et al. |
| 4,290,047 | 9/1981 | Latta, Jr. .................... 340/432 |
| 4,383,238 | 5/1983 | Endo ........................... 340/904 |
| 4,433,325 | 2/1984 | Tanaka et al. .............. 340/937 |
| 4,614,426 | 9/1986 | Baxter et al. ............... 356/1 |
| 4,621,705 | 11/1986 | Etoh ............................ 340/903 |
| 4,635,203 | 1/1987 | Merchant ................... 364/458 |
| 4,656,462 | 4/1987 | Araki et al. ................ 340/556 |
| 4,695,156 | 9/1987 | Taft ............................. 356/1 |
| 4,757,450 | 7/1988 | Etoh ............................ 340/904 |
| 4,891,624 | 1/1990 | Ishikawa et al. ........... 340/436 |
| 4,926,170 | 5/1990 | Beggs et al. ................ 340/903 |

Primary Examiner—Donnie L. Crosland
Attorney, Agent, or Firm—Bernard A. Chiama

[57] ABSTRACT

A passive optical system (POS) is disclosed for detecting the presence of an object, such as a vehicle, in one or more areas of surveillance. The system includes one or more sensor tubes, each having one or more photosensitive devices arranged interiorly at one end and an opening in a wall at the other end, capable of focusing light rays emanating from a specific area of surveillance. Variations in the light rays caused by an object moving into or out of the area of surveillance cause corresponding fluctuations of the light rays impinging on the photosensitive devices, which, in turn, produce variation in a signal. The signal may be utilized to inform the driver of the host vehicle of a nearby vehicle or, when the POS is connected into a cruise control system, to manipulate the host vehicle, accordingly.

17 Claims, 13 Drawing Sheets

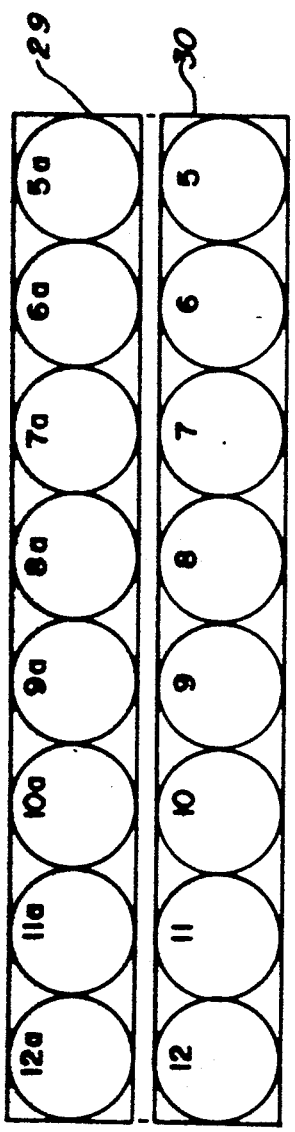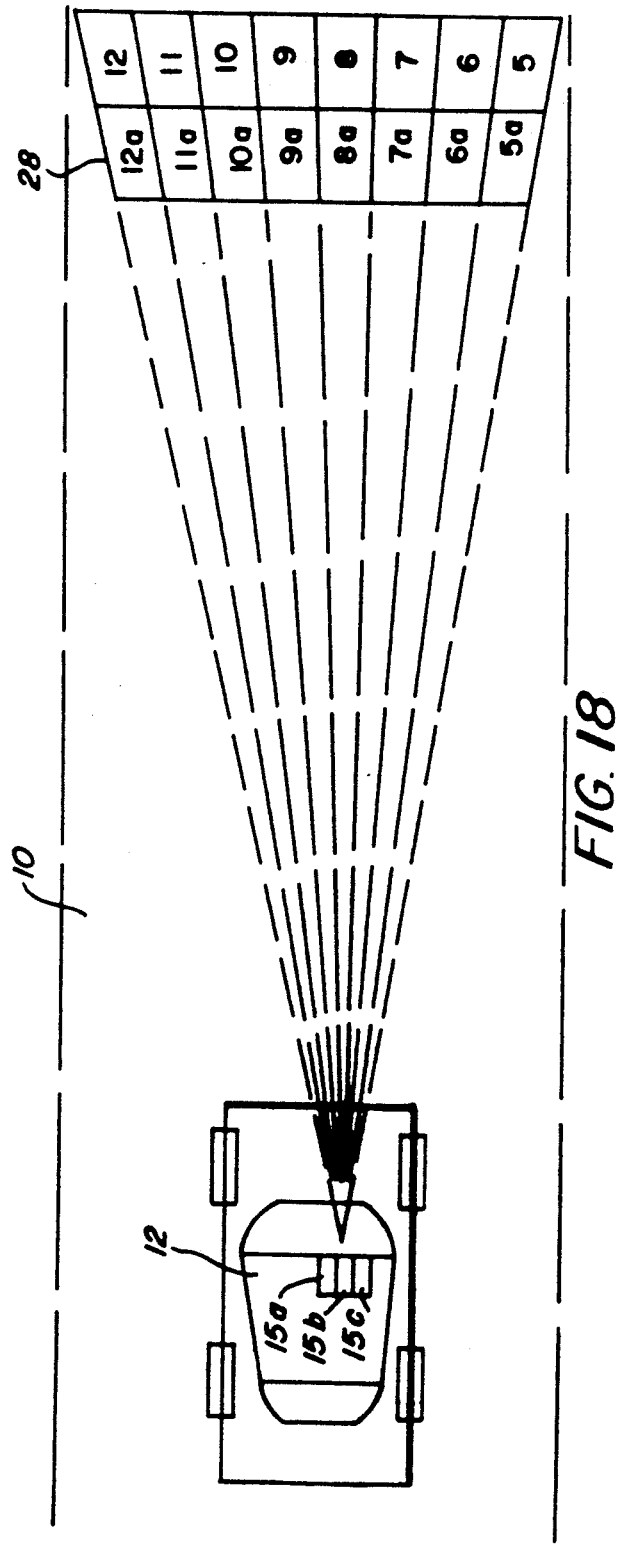
FIG. 17
FIG. 18

PASSIVE VEHICLE PRESENCE DETECTION SYSTEM

BACKGROUND OF THE INVENTION

The present invention relates to vehicle presence detection systems and, more particularly, to a detection system wherein presence signals are passively detected. In its broadest sense, the invention relates to detecting the presence of any object capable of varying light rays emanating therefrom in contrast to the ambient light conditions.

The prior art for vehicle presence systems generally utilize reflected signals, such as in radar systems, for detecting the presence of a vehicle and also the distance relative to the monitoring vehicle. These systems usually require a signal generator in the host vehicle which transmits and directs a suitable scanning signal along one or more lanes of a roadway, and a receiver for picking up the reflected signal from a nearby vehicle struck by the beam of the transmitted signal. These systems are very complicated and require complex electronic circuits, components and microprocessors.

In U.S. Pat. No. 4,258,351, a passive system is disclosed for detecting the presence of vehicles utilizing the change in brightness when a vehicle moves across a designated targeted area on a roadway. While this system may be efficient in use upon the roof of a building, it depends upon the accurate angularity and distance of a detecting device from the target area. The standardized device would not be suitable for use in a moving host vehicle whereby targets to-be-sensed are in continuous motion and at variable distances and angles relative to a target vehicle. The specific sensing device utilized in the patented system is devised to be insensitive to orientation of a target vehicle as to distance and to the relative angularity between the host vehicle and the roadway, or of positioning of one or more target vehicles.

In U.S. Pat. No. 4,433,325, a similar system is disclosed wherein a camera is mounted for surveillance upon a measured pole and has photocells therein angularly related to target points on a roadway.

The space monitoring system disclosed in U.S. Pat. No. 3,972,021 requires detecting devices to be mounted on a plurality of traffic light posts and therefore use in a moving vehicle is not feasible. Furthermore, the patented system is very complex with respect to the details incorporated in the detecting devices. The system relies on the analysis of measurements of a signal phase and amplitude and their variations with respect to the presence and/or motion of objects within a field of detection. A passive electro-optical device is disclosed for use in a rangefinding system in U.S. Pat. No. 4,009,960.

The present invention has many advantages over the art, most notably the POS system uses inexpensive commercially available components and the small size of the POS tube(s) requires a minimum of space for installation, and may permit a variety of mounting locations which would otherwise be impractical for larger units used in the other systems. The POS system is a single unit relying on passively reflected light in order to function while other systems require both a transmitter and receiver of some kind. Active systems such as radar, infrared, ultrasonic, etc. require transmitters and receivers which are relatively expensive to manufacture and are complex in construction. They also require careful calibration to function properly and may require periodic recalibration due to loss of accuracy from road vibrations, etc.

Other advantages will become apparent since the other systems previously mentioned have limited applications while the POS system is adaptable to a wide variety of uses. Other, active systems require electrical energy to power a transmitter and receiver whereas the POS system requires a minimal amount of electrical energy to perform its functions and may act more like a switching device. Wide-spread use of ground level radar or microwave transmissions may pose possible and unforeseen long-term health hazards for the public. The POS system offers simplified installation since complex wiring is not required, and the small physical size of the POS system contributes to ease of installation. The POS system has no moving parts to wear out and affect accuracy. It does not need complex electronic components thereby reducing the possibility of component related malfunctions. Finally, the POS system does not cause interference with police radar, citizen's radar detectors, remote control garage door openers or other devices utilizing microwaves for operation.

Therefore, it is the principal object of the invention to detect the presence or absence of moving objects, such as vehicles, on a roadway in a manner which is efficient, simple and provides highly credible information for the operator of the vehicle.

It is another object of the invention to utilize a passive object detection system in a vehicle cruise control system, thereby effecting credible control of the vehicle under conditions of functional visibility.

In accomplishing the object of the present invention, a Passive Optical Sensor, herinafter referred to as "POS", is devised to react to a change in the intensity of light passively reflected from its field of surveillance in response to the sudden presence or absence of an object within its field of surveillance.

Monitoring the field of surveillance is accomplished using a single photosensitive device or an array of such devices within tube structures arranged to be directed at one or more areas of surveillance. The devices may be arranged in a single linear array or multiple arrays and be monitored individually or in cell-pairs for voltage or current fluctuations. These fluctuations are interpreted as indicating the presence of an object such as a vehicle, the relative motion of the vehicle and its direction of movement for use either to alert the driver or to automatically control his own vehicle accordingly. The photosensitive devices may include photoresistive photocells, such as the silicon dioxide or gallium arsenide types, or any PV cells made by stacking different PV materials, as known in the art, or phototransistors, because of their faster response times or any other light sensitive device.

These and other objects of the invention will become apparent after reviewing the following description taken in conjunction with the accompanying drawings.

BRIEF DESCRIPTION OF THE DRAWINGS

FIGS. 1, 2 and 3 are schematic views of a typical roadway with vehicles thereon, one of which incorporates the invention;

FIG. 8 is a cross-sectional view of one of the sensor tubes taken along the line 8—8 in FIG. 7a;

FIG. 17 is a schematic view of dual photocell arrays which may function as cell-pairs;

FIG. 18 is a plan view of a roadway showing the area of surveillance in greater detail;

DESCRIPTION OF THE PREFERRED EMBODIMENT

Figure 4:
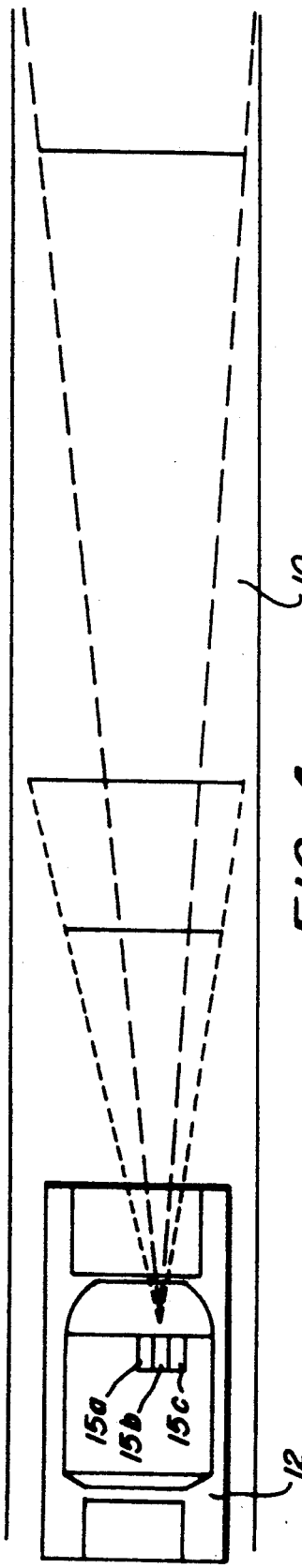
FIGS. 4 and 5 are plan views of the roadway in FIG. 1 showing areas of surveillance being scanned by the invention.
Figure 5:
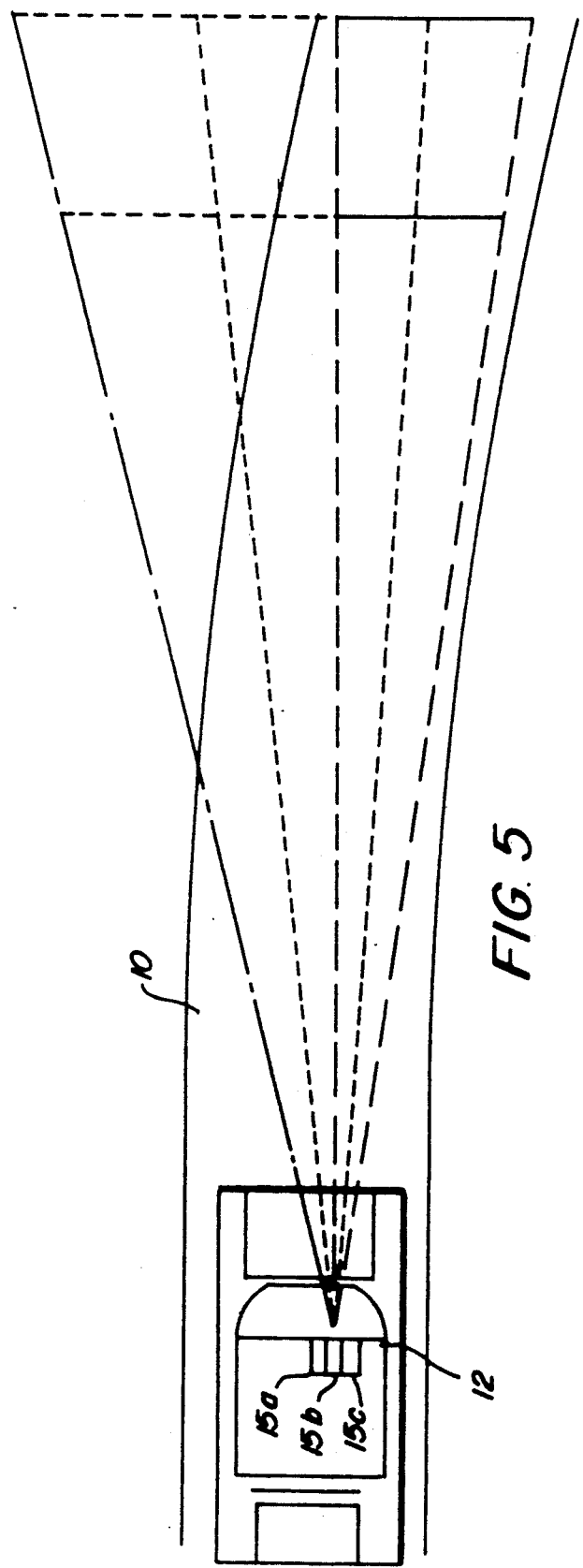

In the vehicle presence detecting system of the present invention, a roadway 10, as shown in FIGS. 1-3, immediately before a host vehicle 12 endowed with the system is continuously scanned for the presence of one or more target vehicles. This scanning activity of the system is maintained regardless of the orientation of the roadway, that is, for straightaway roads, as shown in FIG. 4, for upward or downward inclines or for curves in either direction, as shown in FIG. 5. As shown in FIGS. 1-3, the vehicle 12, which is provided with the POS system, is shown on a roadway a few car lengths behind another vehicle 14 on the same roadway or in the same lane of traffic if the roadway is of the multiple lane type. The POS system, as will be described below, is arranged on vehicle 12 as an illustrative example only to scan the one or more lanes of the roadway 10.

The POS system comprises a set of two small hollow tubes 15a, 15b, having oval cross-sections, each being interiorly lined with a non-reflective coating or material to absorb extraneous light which is directed into the tubes. The rear interior end of each of the tubes supports a photosensitive device 16, 16a which, for illustrative purposes, comprises a plurality of identical and independently functioning photo-cells 17, 17a, preferably eight in number, arranged in an array having a height of one cell. Each cell may utilize gallium arsenide, cadmium sulfide or other suitable light sensitive material. Any other photo sensitive device may also be used, such as CCD's. Such cells are readily available in the market and are not intended to be claimed per se as inventive herein.

The other end of each tubes is provided with walls 18a, 18b, formed with slits 19a, 19b, respectively, which may be left open or capped with a compatible solid material having an opening of predetermined slit shape, width, height and orientation based on application. Photochromic or similar glass, which responds to increasing light intensity by darkening, may be utilized as a filter in front of or immediately behind a slit to reduce the chance of light of very high intensity from causing damage to the photosensitive devices. The longitudinal axes of the slits 19a, 19b are arranged parallel to the axes of the corresponding arrays 16, 16a which are coincident with the long axes of the oval cross-section. The sensor tubes may be filled with nitrogen gas to prevent condensation, or may be evacuated to enhance light transmission and to prevent condensation.

Each of the tubes 15a, 15b of the POS system is aimed at a specific area of the roadway 10. For example, the sensor tube 15a with slit 19a is aimed at a section of the road approximately seven car lengths in front of the host vehicle and is limited laterally to viewing the area approximately within the confines of the traffic lane in which the host vehicle is being driven, as shown in FIG. 1. This scanning is accomplished by varying the dimensions of the slit opening 19a.

The sensor tube 15b is aimed at a section of the roadway two or three car lengths in front of the host vehicle and is limited laterally to viewing the area within the confines of the traffic lane in which the host vehicle is being driven, as shown in FIG. 1.

Figure 9:
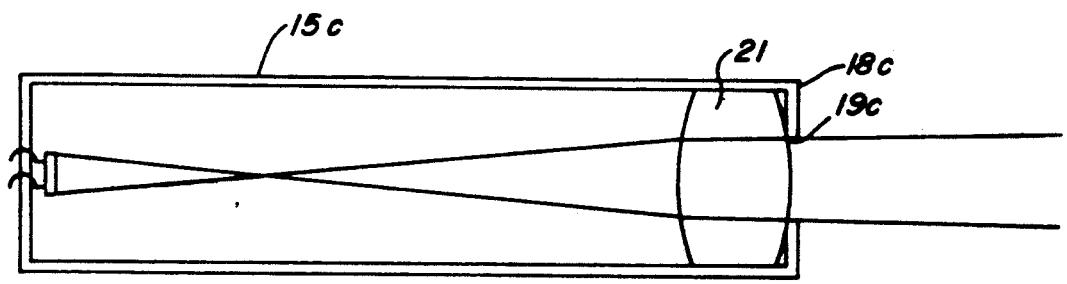
FIG. 9 is a cross-sectional view of the ambient light sensor tube taken along the line 9—9 in FIG. 7c.

The POS system also includes an ambient light sensor tube 15c internally coated with non-reflective material. This tube is aimed forward on a generally horizontal plane, parallel to the center line of the host vehicle and arranged to monitor the ambient light levels from the general direction of the area of surveillance. As shown in FIGS. 7c and 9, use may be made of a light gathering lens 21 at the forward end of this tube for achieving a more accurate measurement of ambient light levels and a forward wall 18c having a slit 19c formed thereon. Still another arrangement would involve the elimination of the horizontal slit and end cap, leaving the entire area of the tube open for light gathering.

Figure 8:
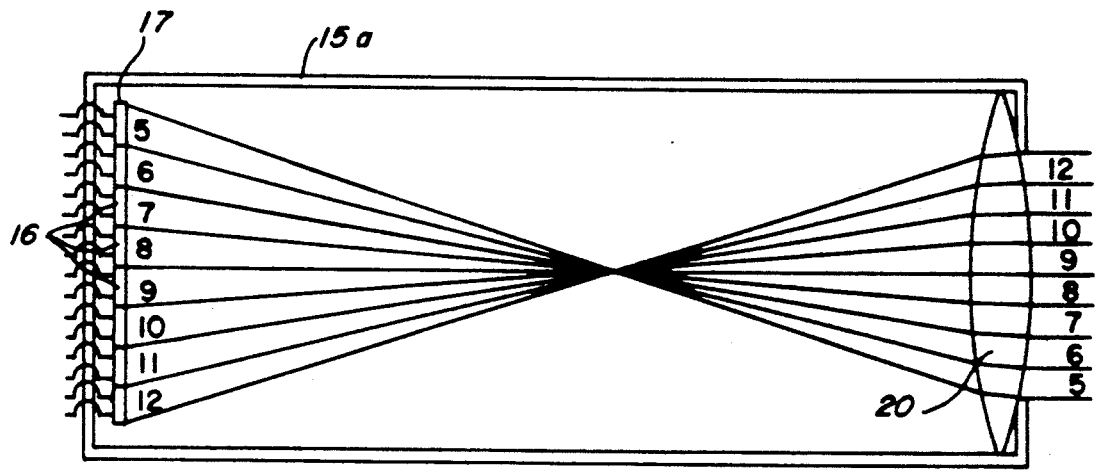
Figure 13:
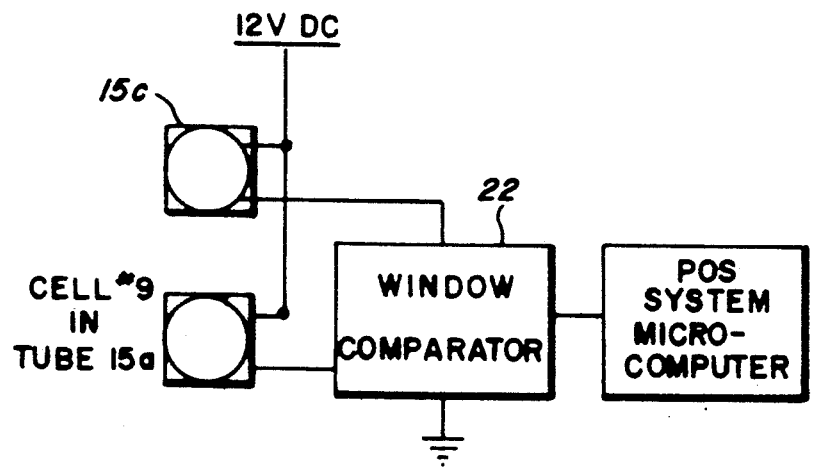
FIG. 13 is a schematic illustration of a control arrangement of a single cell.
Figure 14:
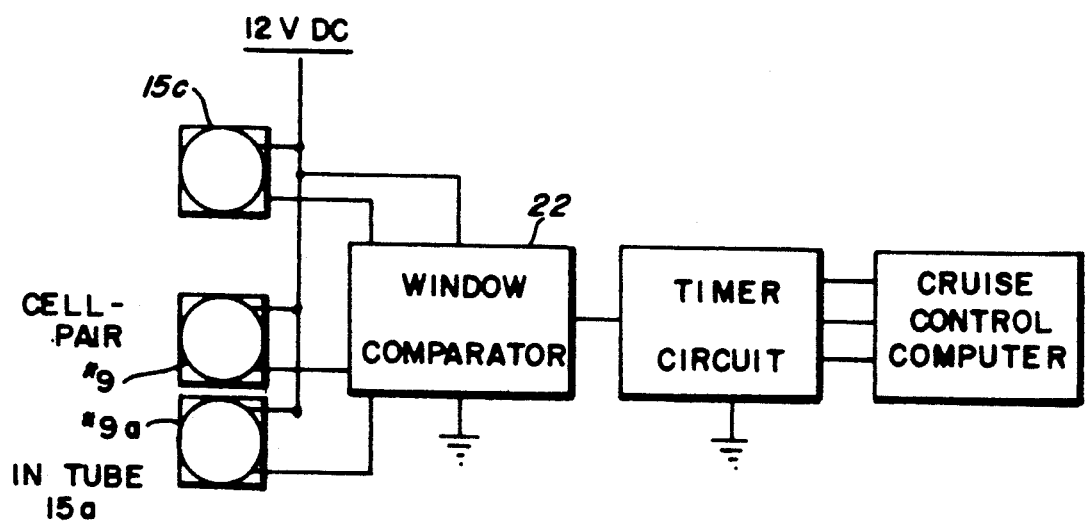
FIG. 14 is a schematic illustration of a control arrangement for the cruise control system of a host vehicle.

In the detailed cross-sectional view of the sensor tube 15a in FIG. 8, the array 16 is shown with the eight individually functioning cells 17, numbered from #5 to #12 as receiving focusing light rays from corresponding inverted segments of light from an area of surveillance through a converging lens 20. These segments are also numbered #5 to #12 in accordance with the focused light rays on the respective cell. The sensor tube 15b is similarly constructed except for the height of the respective light admitting slot. Each of the sensor tubes 15a, 15b functions in conjunction with the ambient light sensor 15c and a window comparator with the resultant output being monitored by the system microcomputer. Each of the cells 17 is connected to the window comparator, as shown in FIG. 13, only one of which is shown: cell #9 of tube 15a, which would also be the arrangement if only one cell comprised the photosensitive device. In the event that cell-pairs are utilized, when two arrays 17 are utilized, one above the other, a cell-pair would be connected as shown in FIG. 14. Cell-pairs arrangements for linear arrays are utilized when more accurate and closer monitoring of vehicle position and movement are desirable. Such arrangements produce a refinement in the production of detecting and/or control signals from the system microcomputer.

The foregoing described sensor tubes may focus entering light rays by virtue of adjusting or varying their widths and lengths by utilizing an optical lens, or combination of both. Light admitted through the slits is focused onto the light sensitive material such as gallium arsenide in a sensing cell or onto a photosensitive cell or a lateral or linear array of such cells.

In one embodiment of the invention, when only a single gallium arsenide cell or other suitable cell is employed in the sensor tubes 15a, 15b, the data, in the form of a fluctuation of light intensity converted into fluctuating voltage, will be monitored by the POS system microcomputer and constantly compared with the ambient light reading taken by the ambient light monitoring sensing tube 15c.

The variation in the reading from sensor tubes 15a, 15b, will usually be gradual, however, when an object such as a vehicle enters the field of vision or area of surveillance of sensor 15a, as in FIG. 2, there will be registered an abrupt change in the voltage which the microcomputer will interpret as the presence of an object. Since the distance between the area of surveillnace and the host vehicle can be mechanically adjusted by varying the angle of one or more of the sensor tubes to the road surface, as depicted in FIGS. 1 and 3, a precise distance between the host vehicle and target vehicle can be easily obtained. This distance may be adjusted at the factory level to conform to government or industry mandated safety parameters.

Figure 6A:
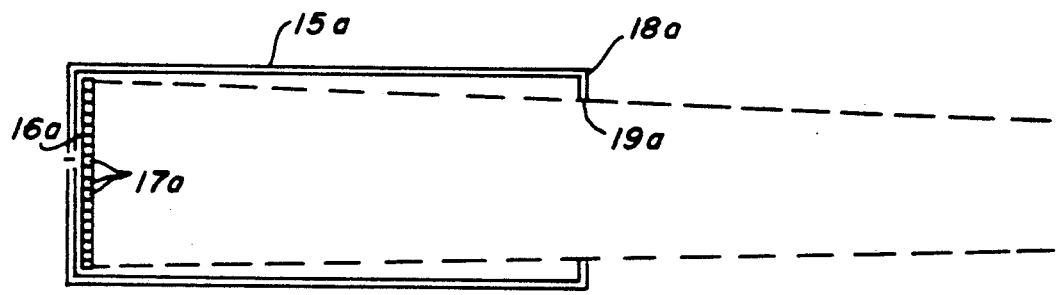
FIGS. 6a, and 6b are cross-sectional views, each being 90° oriented relative to the other of a scanning sensor tube used in the invention.
Figure 6B:
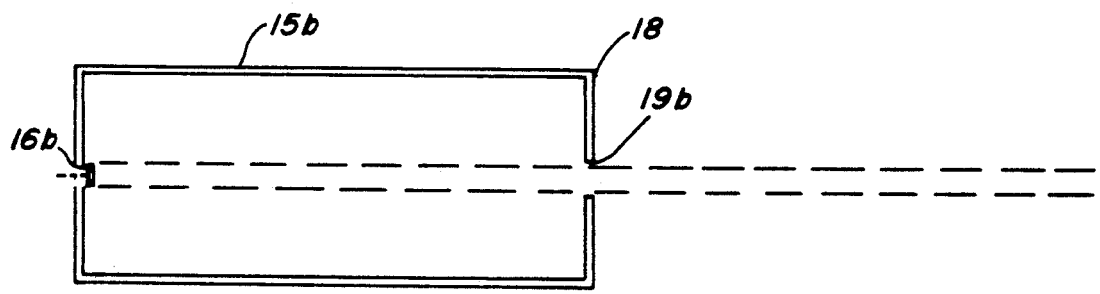

In another embodiment, when a linear array of gallium arsenide or other suitable photosensitive cells is employed, as depicted in FIGS. 6a, 6b, object detection can then be broken down into a number of individual components as the microcomputer of the system controller monitors the light intensity related voltage fluctuations of each of the photocells separately. Light from the slit of the sensor tube is focused on the array, enabling each photovoltaic cell of the array to monitor a specific segment of the road area under the surveillance of the surveillance in such manner as to make detection of a number of different traffic scenarios possible and easily recognizable by a relatively simple computer program.

Figure 10:
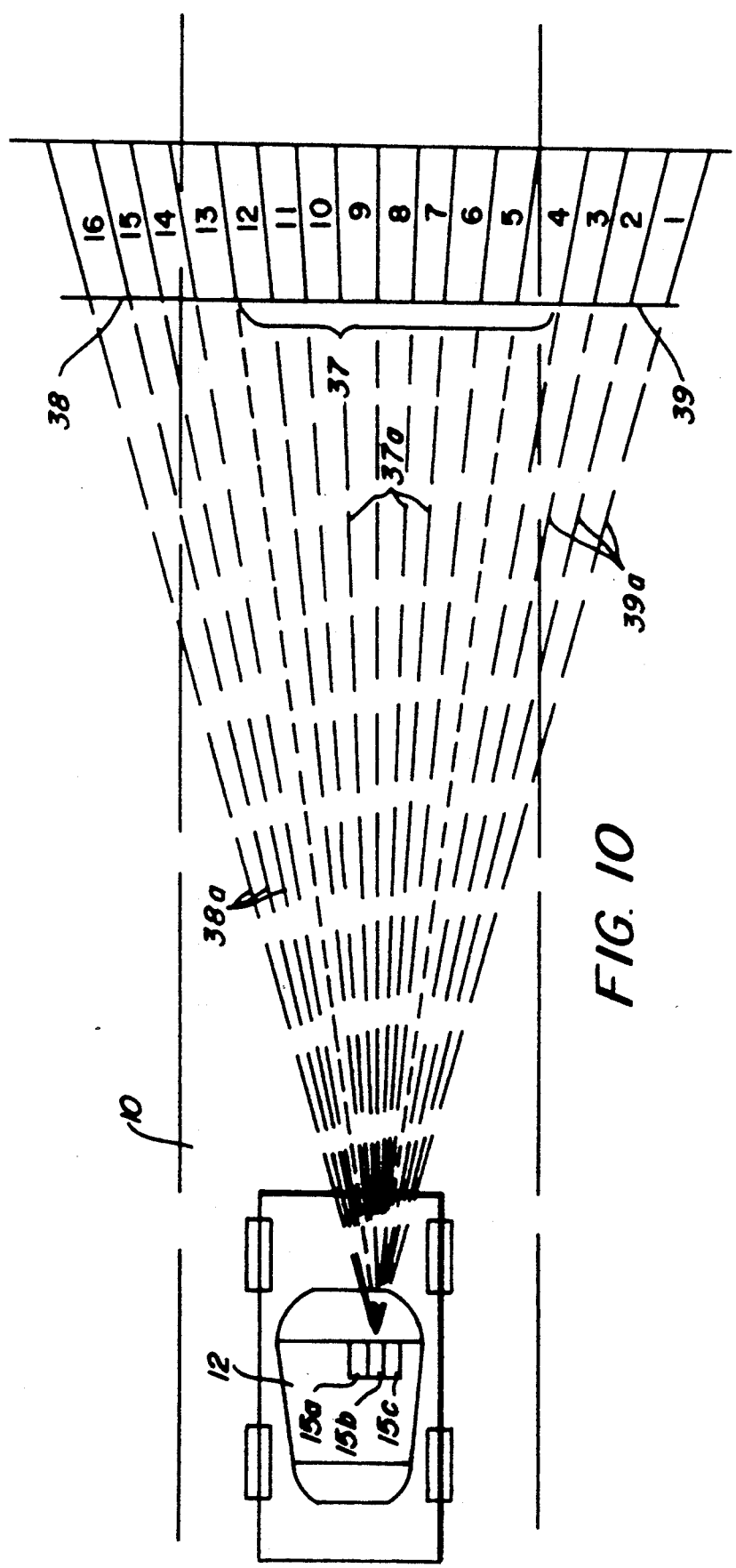
FIG. 10 is a plan view of a roadway showing an area of surveillance in greater detail.

In operation, with a sensor tube mounted in the vehicle 12, as shown in FIG. 10, light enters the same from the area of surveillance 23 which the target vehicle 14 has obscured. The area segments numbered 5 to 12 correspond to the individual segments of light from the area. The inverted focused light impinging the arrays 16 in the sensor tube 15a, for example, will produce an inverted image which is focused segmentally on the corresponding like-numbered photocells. That arrangement allows each photocell of the array to monitor its assigned segment of the area of surveillance within that segment.

These changes in light intensity effect a change in the output of the individual photocells when an object, such as a vehicle, sequentially enters the individual segment of the area of surveillance. The resulting fluctuations in voltage are then compared with the reference voltage from the ambient light sensor 15c through a circuit including the window comparator 22 and the output is monitored and interpreted by the POS system microcomputer, as shown in FIG. 13, for a single cell of the array 16, illustrated as cell #9, and in FIG. 15 for the entire array 16, illustrated as cell #9, and in FIG. 15 for the entire array 16 having individual window comparators in a group 24.

Figure 11:
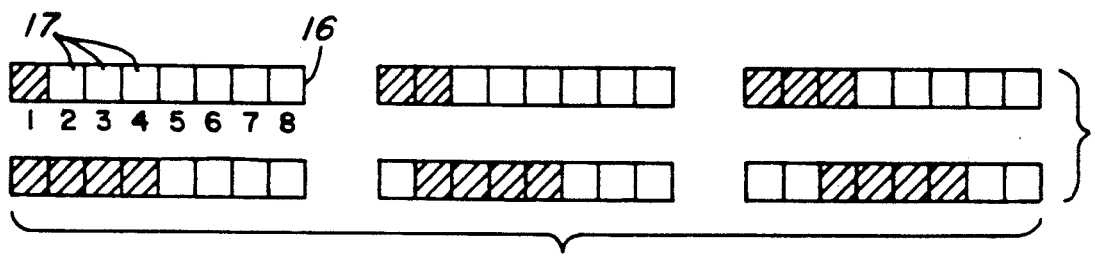
FIG. 11 is a group of schematic illustrations of an array of photosensitive cells showing the progressive effects thereon as a vehicle moves laterally relative to the direction of movement of the scanning vehicle.

In this embodiment, if a vehicle is being monitored at distant range by sensor tube 15a, and a third vehicle cuts between the target vehicle and host vehicle from the left lane, the linear array will be activated from right to left (if the image is inverted), or left to right, in increments, as illustrated in the flowing sequences of FIG. 11. Darkened areas represent changes in voltage of each of the individual photosensitive cells as the third vehicle moves into their field of view. If the third vehicle cuts in from the right to left, the opposite response would occur.

Figure 11A:
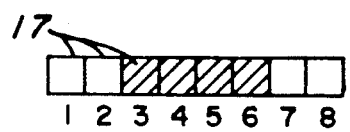
FIG. 11a is a schematic illustration of an array of showing the effects of a host vehicle coming upon another vehicle in the same lane.
Figure 12A:
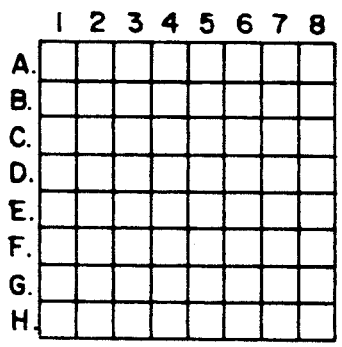
FIGS. 12a, 12b, 12c and 12d are schematic vie plurality of arrays showing the progressive effect of light rays thereon during one condition of operation such as the host vehicle's approach to a target vehicle.
Figure 12B:
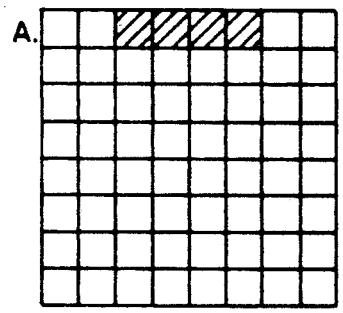
Figure 12C:
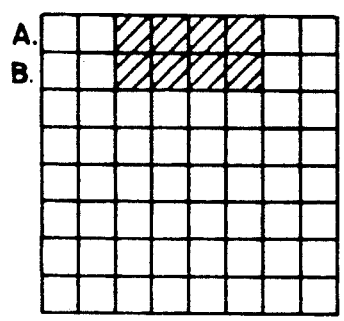

If the host vehicle encroaches on a distant, but slower, moving vehicle, as in FIG. 2, the photosensitive cells in the middle of the array will show voltage fluctuations in unison, as in FIGS. 11a or 12b, while those at either end of the array will remain more or less constant. In the event the target vehicle encounters a rise in elevation while in the area of surveillance, which, for example, is at approximately seven car lengths in front of the host vehicle, and proceeds to climb out of the field of surveillance of the POS sensor tubes as the angle of the road increases, the four middle sensor cells, as shown in FIG. 11a, experience a sudden and uniform change since no light rays impinge thereon. The POS computer is programmed to interpret this change as temporary andto instruct the cruise control computer to maintain its present speed for a short duration of time, that automatic acceleration to a former speed should not be implemented.

As the target vehicle continues to climb, the host vehicle encounters the same rise in elevation, whereupon the target vehicle is again in position to be scanned by the POS sensor tubes causing a return of sensor fluctuations of the middle cells of the array 16, as shown in FIG. 11a. It will be understood that the same scanning activity occurs in the event the road takes a drop in elevation. Both activities can be distinguished from other traffic related events such as shown and described above in relation to FIG. 11 and to the event when the host vehicle changes from a center lane to the left lane in preparation for passing the target vehicle.

While a horizontal, single row array is used for illustration purposes, any other arrangement of sensors, either in a single row or in multiple rows or any other discernible arrangement, is to be considered within the scope and intent of this invention.

It is also acknowledged that by stacking several linear arrays on top of each other, a rate of closure reading may be obtained by sampling response times between arrays indicated as A, B and C as the voltage changes occur, as indicated in FIGS. 12a-12d. Shaded photosensitive cells in 12b, 12c and 12d, indicate a change in voltage as an object progressively obscures the area of surveillance. Unshaded cells indicate approximately constant voltage associated with the unobscured portion of the area of surveillance. Light entering the slit in the sensor tube opening can be readily focused on several linear arrays as easily as it can be focused on one array in accordance with the laws governing optics. The multiple array arrangement of the POS system enables the microcomputer to recognize the presence of an object without the need to make qualitative identification of that object in relation to size or distance.

If more than one forward facing sensor tube is employed, the closest vehicle in front of the host vehicle will obscure the areas of surveillance of the other sensors, as shown in FIG. 3. The voltage fluctuation of the sensor tube 15b, or the combined readings of sensor tubes 15a and 15b, will indicate the intrusion and presence of a vehicle at the closer range. Both sensor tubes will show voltage fluctuations if a taller vehicle is present at the closer range, and sensor 15b, alone, will show voltage changes if a small, low-to-the-ground vehicle is at close range. Distantly aimed sensor tube 15a, alone, will show voltage changes when a vehicle enters its area of surveillance.

The size of the sensor tubes can be enlarged or miniaturized to accommodate the type of photovoltaic or photo-sensitive cells used. The use of fiber optics can allow the main portion of the device (the photo cells and microcomputer) to be remotely located anywhere within the vehicle while sensor input remains in the upper windshield. This would prevent the driver's view through the windshield from being obscured if larger components are used.

A parallel system may also be installed using low-lux sensor components which would be activated when the headlights of a vehicle are switched on, indicating a condition of reduced visibility, as at night time. Photochromic, or similar glass that responds to the intensity of sunlight by darkening, could be used to reduce possible damage to the low-lux components caused by exposure to direct or very intense sunlight. Use of camera-like components (diaphragms, adjustable irises, etc.) are not excluded for this use.

It is also acknowledged that the same effect of aiming the sensor tubes can be accomplished by optical means such as by splitting of images from a single tube, etc., thus having combined the functions of several individual tubes and that any optical variation on the main theme be included within the scope and intent of the invention.

Figure 7A:
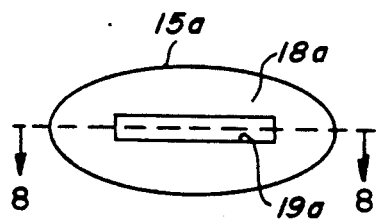
FIGS. 7a, 7b and 7c are end views of the sensor tubes showing light admitting slits.
Figure 7B:
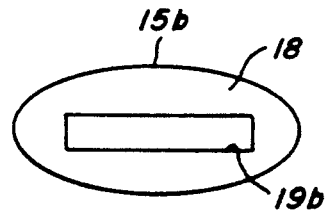
Figure 7C:
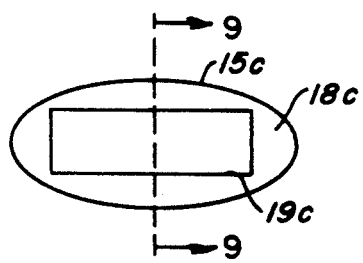

The use of trapezoidal openings 19a, 19b, replacing the rectangular opening in FIGS. 7a, 7b, with the wider area at the bottom and narrower area at the top, may be used to eliminate the trapezoidal coverage area on the road, as shown in FIGS. 4, 5 and 10, thereby enhancing coverage of the lane in which the host vehicle is traveling and eliminating the possibility of missing narrow vehicles such as motorcycles traveling near either edge of the scanned lane.

The use of photochromic glass, or any other type of glass which darkens as light intensity increases, may reduce the effect of sensors being overpowered by too much light. An optical monitor to detect dirt, debris or precipitation on the external window glass may be used to ensure optimal performance of the POS system in circumstances where transmission of light may be reduced or compromised by contamination of the external window glass.

The preferred location of the POS sensor tubes as input devices is high on the inner windshield surface in an area which is normally swept clean by the action of wiper blades. The oval shape cross-sectional sections of the tubes 15a, 15b, 15c enable these tubes to be mounted within a vehicle. However, it is acknowledged that other suitable locations may be discerned and that such variations in location be included within the scope and intent of the invention. The POS system is interfaced with the windshield directly or by using any suitable clear material having the same refractive index as the windshield glass, thereby preventing the sensor tubes from becoming inactivated by dust or other contaminants within the vehicle.

The POS system can be used to automate cruise control functions in several ways, two of which are described below for illustrative purposes.

Figure 15:
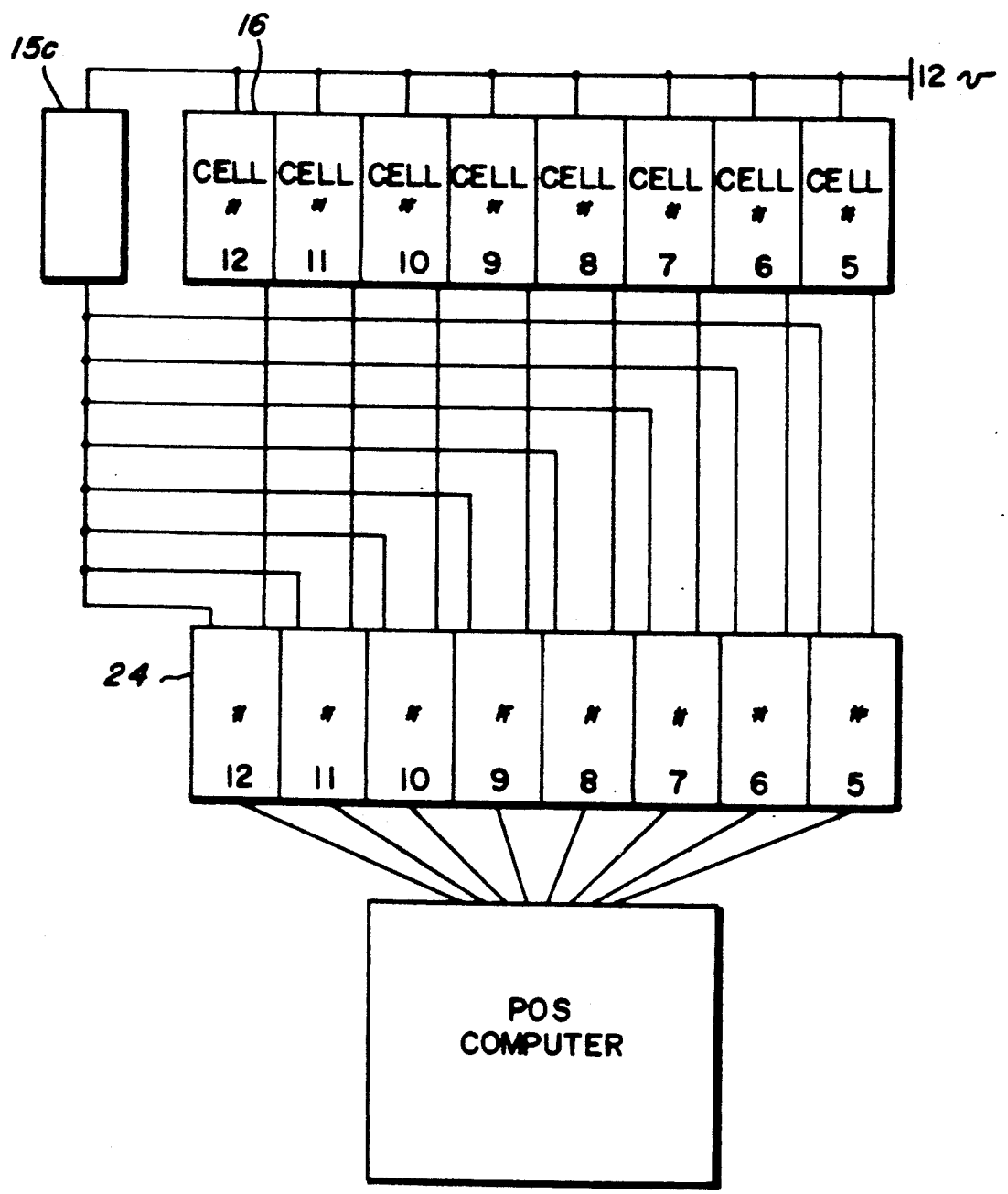
FIG. 15 is a schematic illustration of the control arrangement for a single array.
Figure 16:
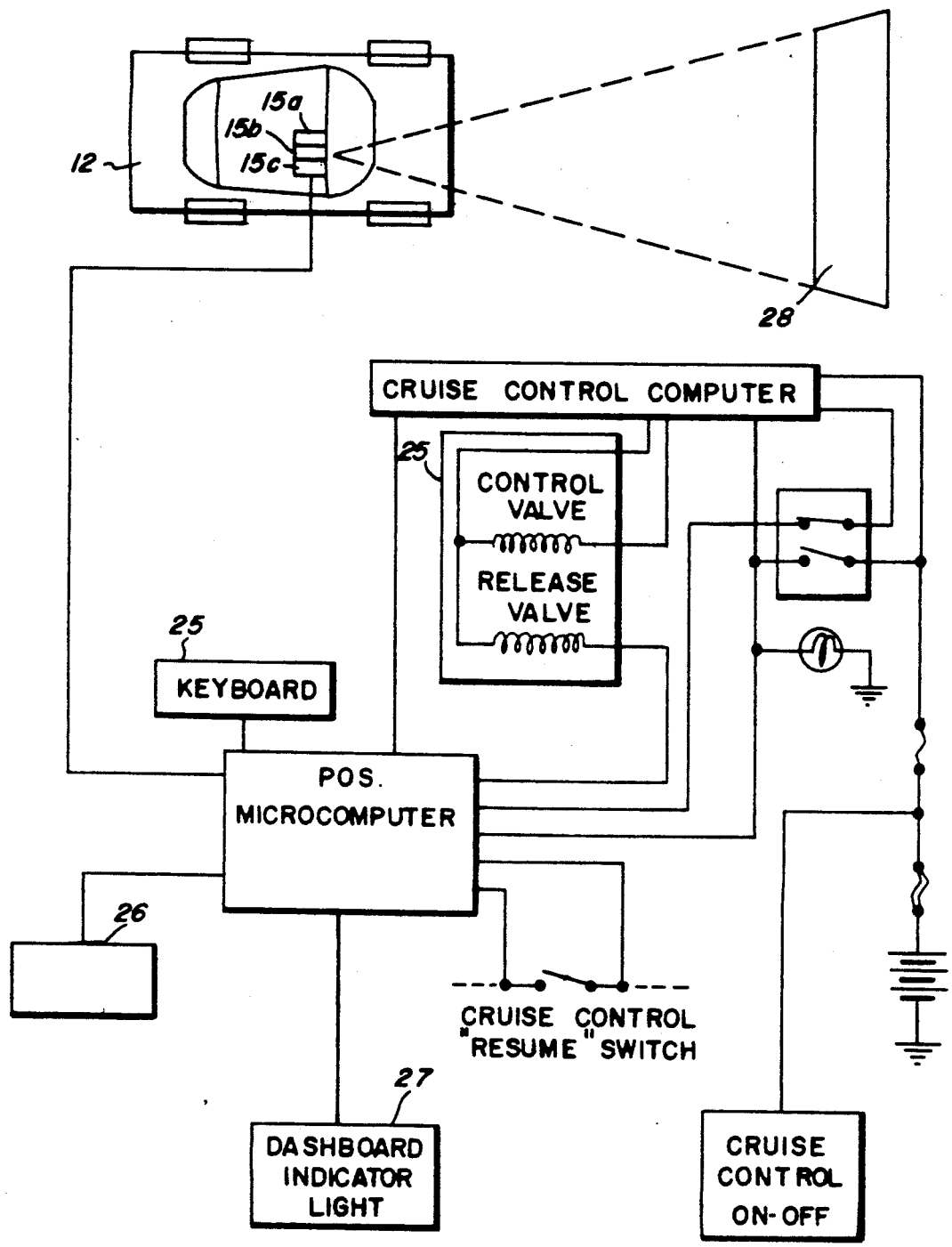
FIG. 16 is a schematic illustration of a cruise control system in detail.

In one arrangement, utilizing a stack of lateral photocell arrays as shown in FIGS. 12a–12d, the POS system will detect the presence of a target vehicle in the manner previously described. The POS system microcomputer, schematically shown in FIGS. 15 and 16, is arranged to signal or effect a break in the circuit to the cruise actuator release valve, for the cruise control system thereby simulating actuation of the brake pedal, or "DECEL" switch by the driver of the vehicle. A rate of closure is derived as previously described with respect to a multiple array, and an automatic braking device 26 is engaged to hasten deceleration if the rate of closure is unacceptably high. As the speed of the host vehicle decreases, the target vehicle will retreat from the area of surveillance array 'C', FIG. 12d, to the area of surveillance array 'B', FIG. 12c. With this occurrence, the POS system microcomputer signals or effects the closing of the cruise control's 'RESUME' circuit, simulating actuation of the 'RESUME' switch by the driver of the vehicle.

The driver may opt either to remain behind the target vehicle, allowing the interplay between the cruise control and POS microcomputer to continue, or to change lanes to pass the target vehicle, thereby breaking sensor contact and automatically resuming the former speed.

Figure 12D:
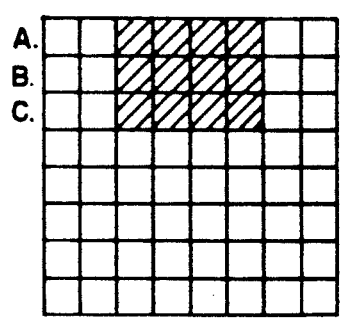

In another arrangement, utilizing a stack of lateral photocell arrays, as shown in the sequence of events in FIGS. 12a–12d, the POS system will detect the presence of a target vehicle in the manner previously described. As the host vehicle approaches the target vehicle, arrays A, B and C fluctuate sequentially, and a rate of closure is calculated. The POS microcomputer, which is interfaced with the cruise control computer as shown in FIGS. 14 and 16, will then direct the cruise control computer to reduce the speed of the vehicle until array C in FIG. 12d is no longer fluctuating. When only arrays A and B are fluctuating, FIG. 12c, the POS microcomputer will direct the cruise control computer to maintain the speed at which array C stopped fluctuating. Again, an automatic braking device may be engaged to hasten deceleration if the rate of closure is unacceptably high.

If the target vehicle accelerates, array B will cease fluctuating and the POS microcomputer will signal the cruise control computer to accelerate until array B is again fluctuating. At this point, the POS microcomputer will direct the cruise control computer to maintain speed at that level. Actuation of the brake pedal, or "RESUME" switch, by the driver will cancel the acceleration phase of this aspect of the programming in the event that the driver does not wish to accelerate automatically. As the host vehicle changes lanes to pass the target vehicle, sensor contact is broken, and the POS microcomputer recalibrates the cruise control computer to resume the speed at thich the host vehicle was traveling before initial sensor contact was made.

Such a cruise control regulating system, as described above, could be utilized effectively as a traffic control system, especially if all vehicles are so equipped. This would greatly lessen the 'accordion' effect which dense traffic is subject to and would improve the overall flow of traffic by maintaining a higher minimum speed. Large quantities of otherwise wasted fuel could be conserved by reducing traffic jams as well as through automatic throttle control.

As an added enhancement, the POS microcomputer will also effect a two to four second flashing of the brake lights for the host vehicle whenever a deceleration action is initiated by the POS microcomputer. A dashboard deceleration indicator 27, audio and/or visual in nature, is included in the POS system to alert the driver that deceleration has been initiated by the POS microcomputer.

In another embodiment, a further enhancement to the POS system may be achieved by adding one or more additional lateral arrays to the existing array, as shown in FIG. 17, and focusing the incoming light from the POS surveillance areas onto both arrays. This will serve to further divide the area of surveillance 28, as illustrated in FIG. 18, nd thereby enable this POS system variation to be used in the cruise control regulating application which will provide finer control of the host vehicle. Light from segments #5–#12 and #5a–#12a of the surveillance area 28 in FIG. 18 is focused onto the like-numbered cell-pair groups 29, 30 of photocells shown in FIG. 17 in the same manner as previously described. It will be appreciated that the number of POS arrays can be varied as can the number and size of component photo-cells per array. The POS wiring for the cruise control application is illustrated in FIGS. 14, 16, and 19 utilizing cell-pairs to both detect the presence of a leading or target vehicle, as well as to adjust the speed of the trailing or host vehicle to approximately match that of the leading or target vehicle.

Figure 19:
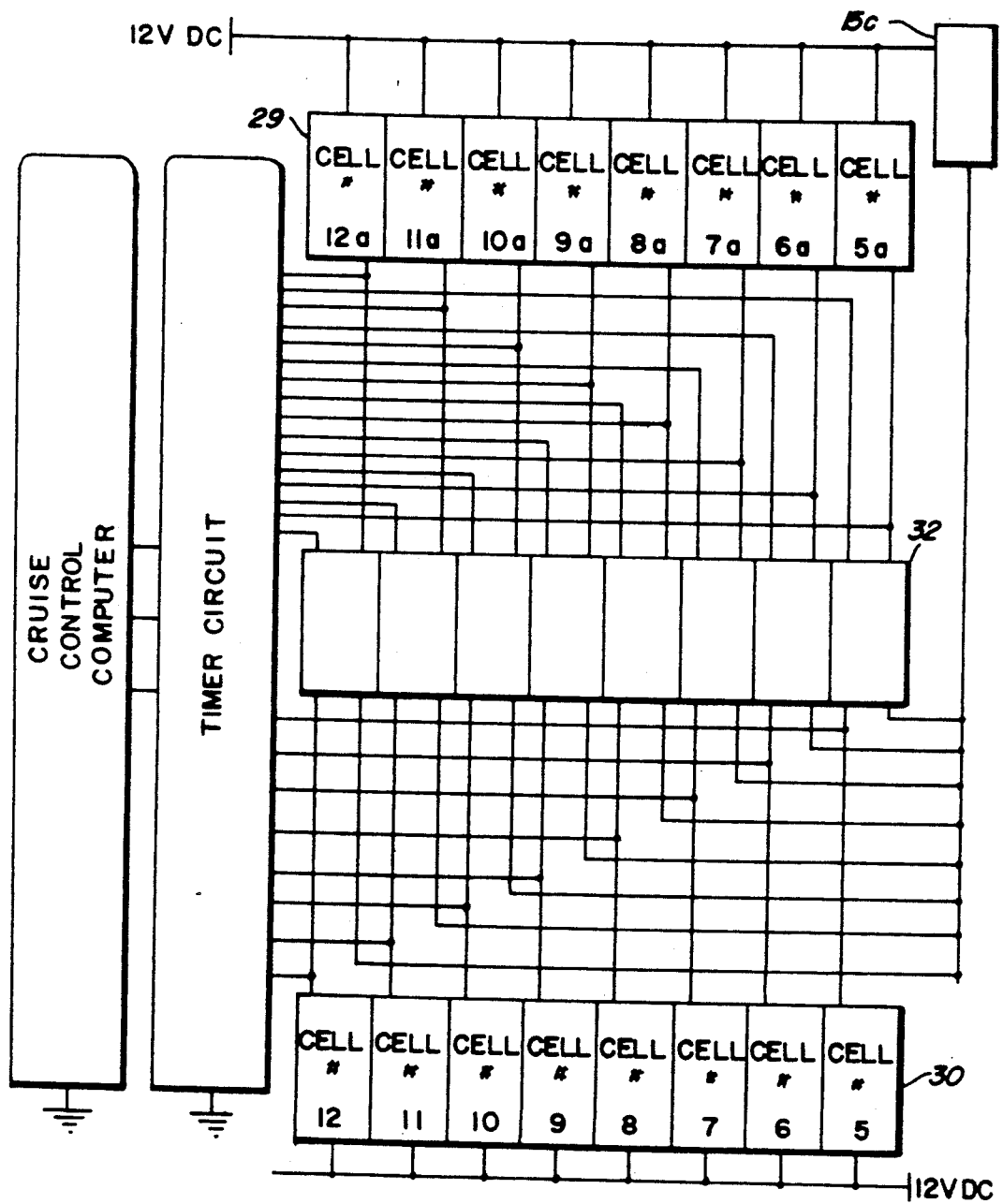
FIG. 19 is a schematic illustration of a cruise control arrangement in conjunction with the arrays in FIG. 17 wherein the timer circuit incorporates functions of the POS computer interactions in the cruise control system of FIG. 16

The following is a description of the operation of the arrangement in FIG. 19. One or more ambient light sensors 15c provide reference voltage to the window comparators 32 when the cruise control is turned on. The lower and upper POS arrays 29, 30 are tilted or separated slightly to give adequate response time between the arrays, and the POS tube 15a is aimed approximately seven car lengths in front of the host vehicle, see FIG. 1, as previously described. The window comparators 32 monitor the difference between the voltage passed by the sensor 15c and that passed by each cell of the individual cell-pairs, as shown in FIG. 17. When the host vehicle overtakes the target vehicle, this causes voltage fluctuations in cells #7–#10, for example. During these fluctuations, the timer circuit(s) monitors the time lapse between voltage fluctuations of cells #7–#10 and #7a–#10a. Voltage fluctuations in cells #7–#10 causes the timer circuit(s) to be turned 'on', while voltage fluctuations in cells #7a–#10a cause the timer circuit(s) to be turned 'off'. The timer program is arranged to calculate the rate of closure of the host vehicle to the target vehicle and compares that calculated value to a signal from the cruise control in the host vehicle computer which indicates the speed of the host vehicle. The window comparators also interact with the timer circuit(s) to confirm the response of the sensor tubes.

As the host vehicle approaches the target vehicle, the latter enters the POS system area of surveillance, causing a change in status of cells #7–#10, for example. The cells #7–#10 respond to the change in light from the surveillance area and send their respective signals to the appropriate window comparator and timer circuit(s). The window comparators compare voltages from the sensor 15c and the individual cells #7–#10 and send signals to the timer circuit(s) indicating a change in status of the cells #7–#10. The change status of the cells starts the timer circuitry.

The host vehicle continues to approach the target vehicle causing a change in the status of the cells #7a–#10a of the upper array. The cells #7a–#10a now respond in the same manner as the cells #7–#10, sending their signals to the window comparators and timer circuit(s). The window comparators compare the voltages from the sensor 30 and the individual cells #7a–#10a and send signals to the timer circuit(s) indicating a change in the status of the cells. This change in status of the cells stops the timer circuitry.

The timer circuit(s) compares the time of the onset of voltage change of cells #7–#10 with those of cells #7a–#10a. Then it compares that value with the speed signal from the cruise control computer in the host vehicle. The timer circuit(s) is programmed to calculate the difference in speed between the target and host vehicles, and in accordance therewith, sends a signal to the cruise control in the host vehicle to adjust the speed to match that of the target vehicle.

Figure 20:
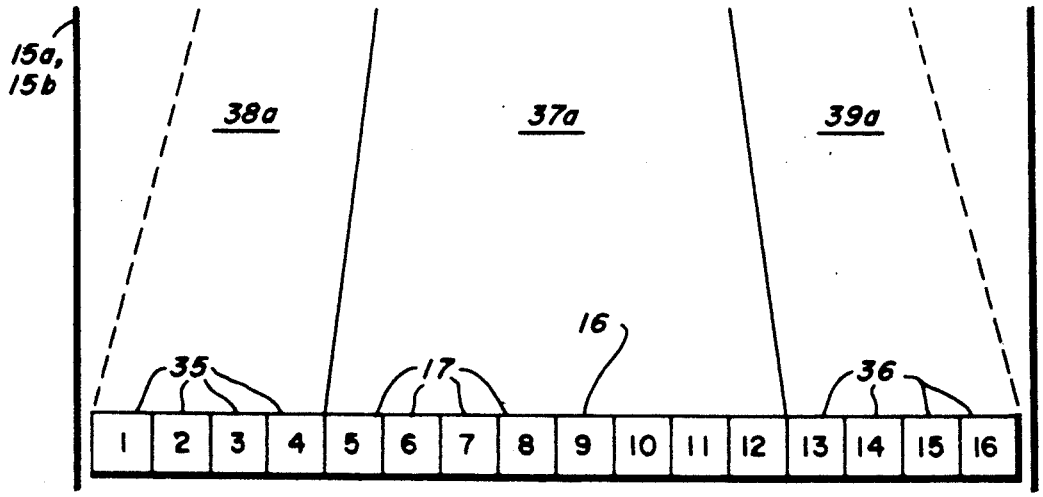
FIG. 20 is a schematic illustration of an embodiment of sensor arrays taken in conjunction with FIG. 10 for use in lateral tracking of vehicles.

Lateral tracking capabilities can be accomplished by adding a group of photovoltaic or other light sensitive devices 35, 36, one at each end of linear array 16, as shown in FIG. 20, which is an enlarged cross-sectional view of the sensing end of either of the sensor tubes 15a or 15b. The photocells 17 of the array 16 actively monitor the area of surveillance 37, as in FIG. 10, by way of the light rays 37a. The groups of photocells 35, 36 monitor the areas of surveillance 38, 39 by way of the light rays 38a, 39a. It is to be noted that there may be overlapping of light rays upon the photocells #4 and #13. Such overlapping may be eliminated with the use of trapezoidal shaped slits for the slits 19a, 19b and 19c.

This arrangement functions in combination with a steering wheel sensor or other motion and/or direction sensing device in the following manner:

The area of sensor surveillance is expanded laterally to the left and right of the straight ahead area of surveillance 37. However, the light from the laterally expanded area 38 and 39 is focused on photocells 35 and 36, respectively, which remain inactive at the computer level while the vehicle is traveling in a straight line. When the steering wheel arc sensor is engaged as the vehicle begins execution of a turn, as shown in FIG. 5, the active photocells 17 in the array 16 are progressively and sequentially inactivated with regard to the computer, while the inactive photocells 35, 36 to the right or left are progressively and sequentially activated at the computer level. Either group portion 35 or 36 of the array in FIG. 20 will become active while cells #5–#8, or cells #9–#12, of the array 16 will become inactive, depending on whether the vehicle, is turning to the right or left. Assuming image inversion is employed, if the vehicle is entering a right handed curve as in FIG. 5, passive photocells #1, 2, 3 and 4 of the group 35 will become actively monitored in sequence: #4, 3, 2 and 1, while the active photocells 17 will become deactivated or unminitored in sequence: #12, 11, 10, 9. The pattern of surveillance area shifts to the right as in FIG. 5. The result is a limited object tracking capability as the vehicle enters a turn. This effect may also be enhanced by arranging the array in a concave or convex pattern facing the incoming light, to increase border coverage area. This system may be used with a singular array or in combination with multiple arrays which are stacked as previously mentioned.

The steering wheel arc sensor will sense the gradual turning of the steering wheel and, in increments, will signal a progressive sequential deactivation and activation of the photocells as previously discussed.

It is also acknowledged that the POS array itself may be mechanically moved with regard to windage and elevation in response to a steering wheel or other sensor to accomplish object tracking capability in turns or curves, inclines and declines.

As shown in FIG. 13, another feature which may be added to the system is a small keypad type device 25 with display integrated with the cruise control system in such a manner as to permit the vehicle operator to enter, via the keypad, the exact speed at which he/she wishes to travel, which will be shown on the display. This keypad type device could be used in place of the current arrangement of switches used to activate and set current cruise controls.

Figure 21:
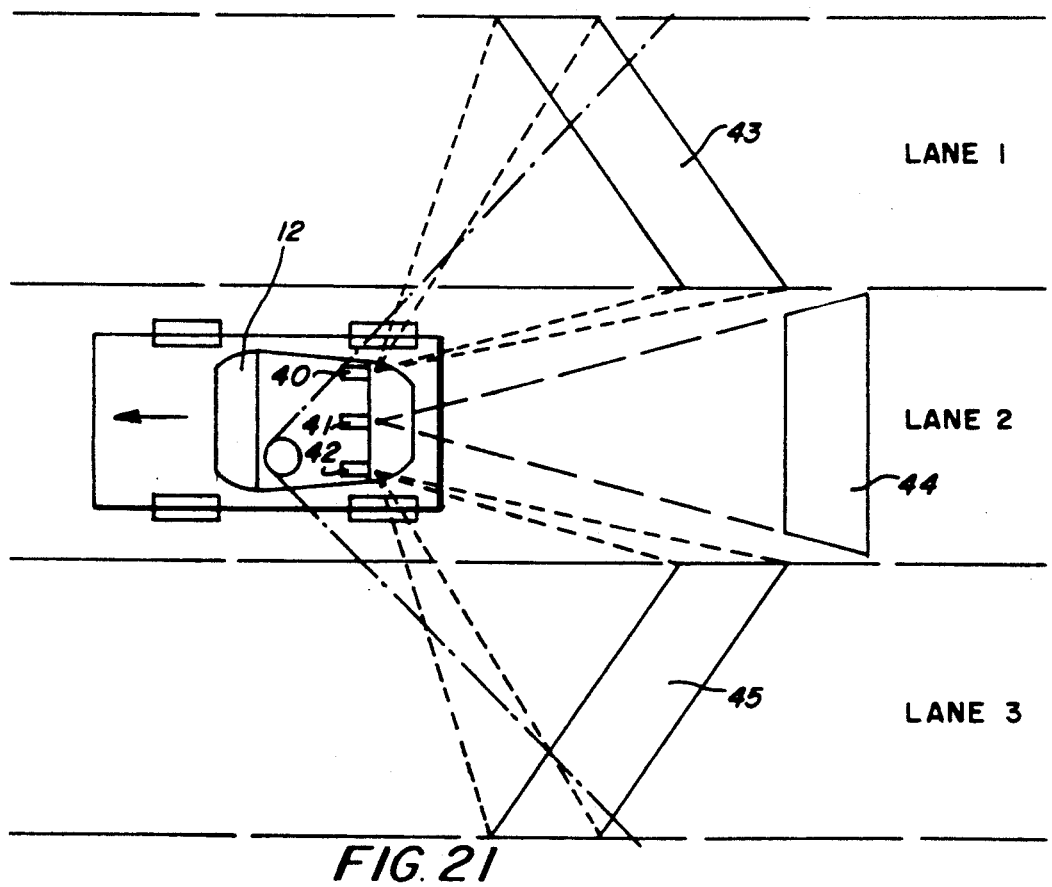
FIG. 21 is a plan view of a roadway showing the scanning capability of a collision avoidance system.

The present invention is also adapted to be utilized in a collision avoidance system. Sensor tubes 40, 41, 42 devised in accordance with sensor tubes 15a, 15b, 15c are mounted high on the interior side or rear window, as shown in FIG. 21, and should be angled down and rearward on both sides of the host vehicle 12 to detect adjacent objects in monitored areas of potential contact. The collision avoidance system, referred to hereinafter as CAVS, is regulated through signals received from suitable sensors connected to the host accelerator, steering mechanism and/or turn signal system of the host vehicle so that it will operate in an alternate mode when the host vehicle passes another vehicle.

When an object is present in an area under surveillance, the CAVS operates to alert the driver with an audio and/or visual signal. The system can be 'on' continuously, giving a visual signal when an object is present and then going to an additional audio alert signal if the operator attempts to change lanes. The CAVS may be turned 'off' or 'on' at the driver's discretion.

The POS tubes at positions 40, 41, 42 are aimed rearward and down toward the road surface and are adjusted to scan the areas of surveillance 43, 44, 45, respectively, forward or rearward from their positions, as illustrated, within the confines of lanes 1, 2 and 3, respectively, and to any pre-determined optimal distance required for appropriate signal initiation. Thus, the same areas of surveillance 43, 45 are positioned to monitor the so-called blind spots of a vehicle located diagonally to the rear of both sides of that vehicle and can be adjusted for each unique blind spot location. For added safety, the areas of surveillance are adjusted to slightly overlap the driver's limits of vision when his head is turned left or right, as illustrated in FIG. 21.

The POS tube 41 is employed for surveillance of the area 44, lane 2, similar to sensors 15a and 15c but pointing directly to the rear and downward to the road surface. The function of the POS sensor 41 is to detect the presence of a "tailgating" vehicle and to initiate the actuation of the brake lights in the host vehicle, the third brake light, or the rear mounted message display panel as a warning to the tailgating driver that safety parameters with regard to safe following distances have been violated. The driver of the host vehicle will be alerted to the presence of the trailing vehicle by an audio and/or visual signal.

Although the POS system has been described for brake light actuation, etc., it is understood that any sensor capable of detecting the presence of an object may be suitably employed for this purpose and that such usage is to be included within the scope and intent of the invention.

Figure 22:
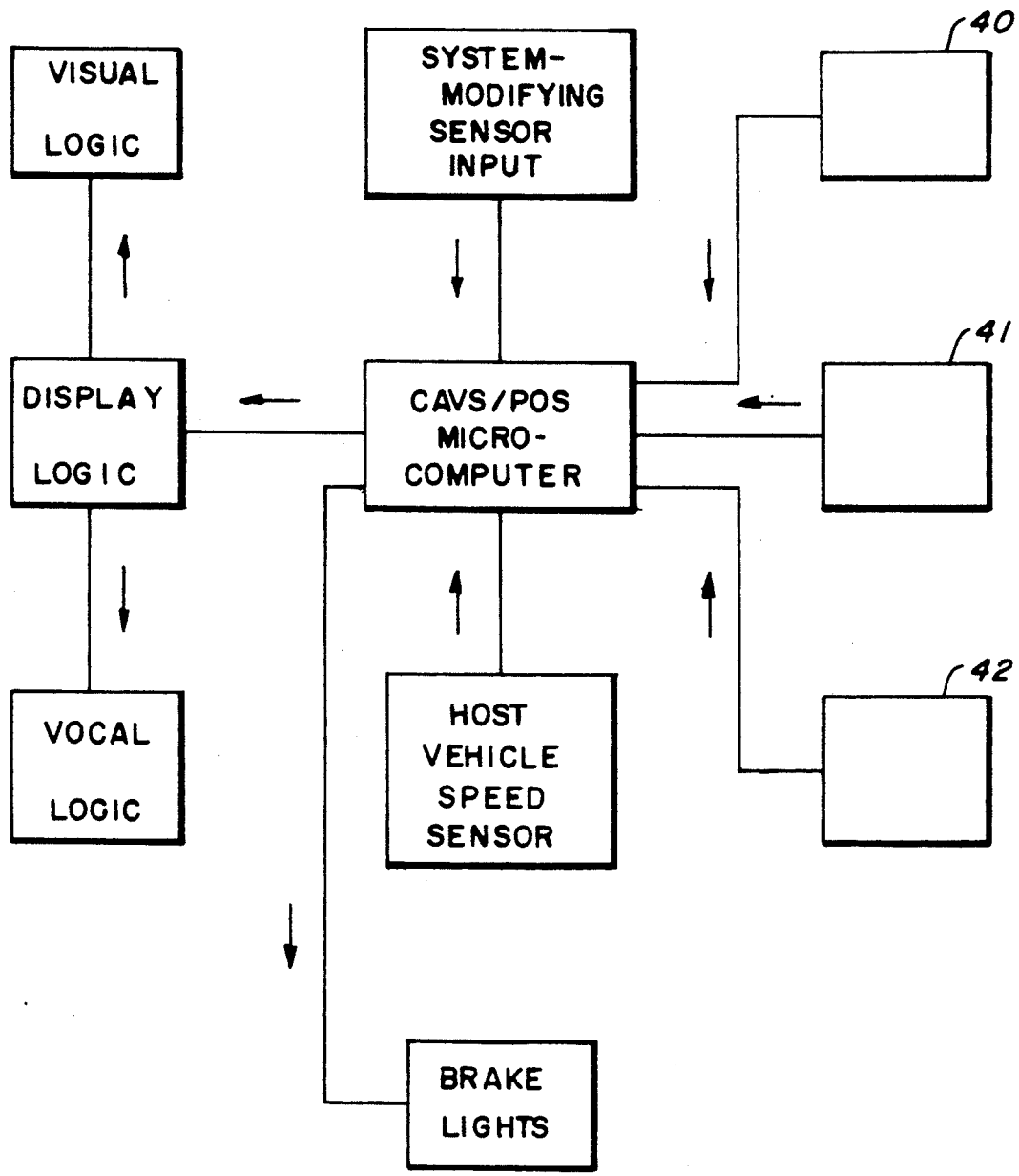
FIG. 22 is a schematic illustration of the control system for the collision avoidance system.

Several POS tubes may be employed, each with an area of surveillance at its own predetermined distance from the rear of the host vehicle, within the confines of lane 2. This will enable the CAVS computer, as shown in FIG. 22, to correlate the host vehicle speed with recommended safe following distances and initiate brake lights, etc., actuation when appropriate. The CAVS computer functions the same as the POS computer previously described, in relation to data from the POS sensor or sensors, and directs initiation of the appropriate alert signals when the respective areas of surveillance become obscured by the presence of a vehicle.

In addition, tracking capabilities, as previously described, can be employed in these side and rear-facing sensors, although the sensing sequences will be reversed to accommodate reversed road curvature as seen from sensor tubes 40, 41 and 42 posterior view of the road.

In addition, as previously described, the areas of surveillance may be illuminated by on-board light sources having visible or non-visible spectra, for times of low visibility and for night time use. Activation of light sources may be linked to the headlight switch for the host vehicle.

The POS system described above also has particular application in aviation as a visual monitor when aimed at desired sectors of the airspace surrounding an aircraft. It may be useful as an adjunct to the pilot's visual review of the surrounding sky and may be linked to aircraft detection and collision avoidance systems, functioning as an additional backup system or as a freestanding device producing an audio and/or visual alert signal or warning.

The POS sensor tubes can be utilized as sensors for an airspace intrusion detector and/or collision avoidance system and would function in object detection identically to its previously mentioned application with respect to automobiles. However, the POS system would activate an audio and/or visual alarm to alert the pilot to potential danger.

The sensor tubes may be distance regulated using an optical lens or lenses which will bring objects which are at an optically pre-determined distance into focus. An array of sensors, each with a lens or lenses pre-focused to a specific distance, can be used to monitor an area for target aircraft at the distances determined by the lens or lenses used. The pertinent distances will be determined by safe aviation practices. In military aircraft applications, the POS system could be used as a detector of approaching hostile aircraft either in conjunction with existing systems or as a free-standing unit.

A spherical arrangement of sensors may be employed in such a manner as to provide coverage of all airspace surrounding the aircraft. Sensor field can be arranged to overlap and to provide complete coverage. Another possible configuration consists of a group of sensors aimed at one area and mounted in such a manner that they can be continuously rotated by means of a small motor, thereby providing complete sensor field coverage. Other configurations and locations may be discerned and are to be considered within the scope and intent of this invention.

The present invention has many advantages over the art. Most notably, the POS system uses inexpensive commercially available components, and the small size of the POS tube(s) requires a minimum of space for installation and may permit a variety of mounting locations which would be otherwise impractical for larger units used in the other systems. The POS system is a single unit relying on passively reflected light in order to function while other systems require both a transmitter and receiver of some kind.

While this invention has been described in connection with different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and fall within the scope of the invention or the limits of the appended claims.

What is claimed is:

1. In a passive optical system for use in a host vehicle for detecting the presence of one or more target vehicles in an area of surveillance, comprising
at least one tubular sensor member mounted on the host vehicle and arranged with its longitudinal axis directed to the area of surveillance in which the target vehicle may intrude, said tubular sensor member having a light sensitive device including at least one light sensitive cell mounted interiorly thereof at one end and being adapted for sensing the light variations of light rays entering and projecting through said member in response to one or more target vehicles intruding into the area of surveillance, said cell being adapted for producing a signal in accordance with variations thereof and therefore the presence of one or more target vehicles, said member also being formed with means for directing and focusing light rays emanating from the area of surveillance, through said member and upon said at least one light sensitive cell.

2. The system as defined in claim 1 wherein said means for directing and focusing light rays includes a wall closing off the other end of said tube and having an opening formed therein through which the light rays project.

3. The system as defined in claim 1 wherein said light sensitive device includes a linear array of a plurality of cells, said cells being oriented in a line arranged to scan the target vehicle moving from outside the area of surveillance on one side thereof to the area of surveillance whereby light rays indicative of the moving vehicle strike the end cell of said array and sequentially move therealong.

4. The system as defined in claim 1 wherein said light sensitive device includes a linear array of a plurality of cells arranged along a line and said means for directing and focusing light rays including a light admitting member having a slit formed thereon with its axis arranged parallel to said line.

5. The system as defined in claim 1 including a second sensor tube mounted on the host vehicle arranged for sensing a second area of surveillance 6. The system as defined in claim 5, including a sensor tube aranged for sensing the ambient light conditions adjacent the areas of surveillance.

7. The system as defined in claim 1 including a sensor tube arranged for sensing the ambient light conditions adjacent the area of surveillance 8. The system as defined in claim 1 wherein said light sensitive device includes a stack of a plurality of cells, said cells being oriented in a line arranged to sequentially monitor the target vehicle in either direction as the host vehicle approaches or recedes from the target vehicle, respectively, within the area of surveillance whereby light rays indicative of the distance between the vehicles strike either end cell of said stack and sequentially move therealong.

9. The system as defined in claim 8 wherein the host vehicle includes a cruise control system and said light sensitive device is operatively associated with said system for controlling the speed of the host vehicle in accordance with relative movement between the vehicles.

10. The system as defined in claim 1 wherein said light sensitive device includes a linear array of cells and the passive optical system includes a control system operatively connected to said cells, said control system being arranged to deactivate the cells at one end of said array and activate the cells at the other end thereof when the host vehicle is turning along a curve along a roadway.

11. In a passive optical system for use in detecting the presence of one or more objects in an area of surveillance, comprising
a tubular sensing member arranged with its longitudinal axis directed to the area of surveillance in which the object may intrude, said sensor member having a light sensitive device including at least one light sensitive cell mounted interiorly thereof at one end and being adapted for sensing the light variations of light rays entering and projecting through said member in response to light variations produced between light rays emanating from one or more target vehicles intruding into the area of surveillance and the light rays emanating from the ambient light conditions adjacent or within the area of surveillance, said member being adapted to produce a signal in accordance with variations thereof, said member also being formed with means for directing and focusing light rays emanating from the area of surveillance through said tubular member and upon said at least one light sensitive cell, and a second sensor member arranged for sensing the ambient light conditions within the area of surveillance.

12. The system as defined in claim 11 wherein said means for directing and focusing light rays includes a wall closing off the other end of said tube and having an opening formed therein through which the light rays project.

13. A passive optical system for use in a host vehicle for detecting the presence of a target vehicle approaching the host vehicle and to avoid collision therewith, comprising
a plurality of tubular sensor members mounted on the host vehicle and arranged with one of said members having its longitudinal axis directed to the area of surveillance rearwardly of the host vehicle and two others of said members having their longitudinal axes for sensing directed to the areas of surveillance outwardly form the sides of the host vehicle, respectively, in which the target vehicle may intrude, each of said sensor members having a light sensitive device including at least one light sensitive cell mounted interiorly thereof at one end and being adapted for sensing light variations of light rays entering and projecting through said member in response to light variations produced between light rays emanating from one or more target vehicles intruding into the area of surveillance and the light rays emanating from the ambient light conditions adjacent and within the area of surveillance, each of said members being adapted to produce a signal in accordance with said light variations thereat, each of said members also being formed with means for directing and focusing light rays emanating from their respective areas of surveillance, through said tubular member and upon said light sensitive cell associated therewith.

14. The system as defined in claim 13 wherein said light sensitive device includes a linear array of a plurality of cells arranged along a line and said means for directing and focusing light rays including a light admitting member having a slit formed thereon with its axis arranged parallel to said line.

15. A passive optical system for use in a host aircraft for detecting the presence of one or more aircraft in airspace under surveillance, comprising
a plurality of sensing tubes, each being arranged with its longitudinal axis directed to a predetermined portion of the air-space under surveillance in which an aircraft may intrude, each of said sensor tubes having a light sensitive device including at least one light sensitive cell mounted interiorly thereof at one end and being adapted for sensing light variations of light rays entering and projecting through said tube in response to light variations produced between light rays emanating from one or more target aircraft intruding into the airspace under surveillance and the light rays emanating from the ambient light conditions within the airspace under surveillance, said tubes being adapted to produce a signal in accordance with said light variations thereon, each of said tubes also being formed with means for directing and focusing light rays emanating from their respective portions of the airspace under surveillance upon said at least one light sensitive cell, said means for directing and focusing including a lens device prefocused to a predetermined distance into its respective portion of the airspace.

16. The system as defined in claim 15 wherein said plurality of sensor tubes are arranged in the host aircraft for scanning spherically thereabout.

17. In a passive optical system for use in a host vehicle for detecting the presence of one or more target vehicles in an area of surveillance, comprising
at least one cylindrical sensor member mounted on the host vehicle and arranged with its longitudinal axis directed to the area of surveillance in which the target vehicle may intrude, said sensor member having a light sensitive device including at least one light sensitive cell mounted interiorly thereof at one end and being adapted for sensing the light variations of light rays entering said member in response to one or more target vehicles intruding into the area of surveillance, said cell being adapted for producing a signal in accordance with variations thereof and therefore the presence of one or more target vehicles, said member also being formed with means for directing and focusing light rays emanating from the area of surveillance upon said at least one light sensitive cell, said light sensitive including a linear array of cells and the passive optical system including a control system operatively connected to said cells, said control system being arranged to deactivate the cells at one end of sid array and activate the cells at the other end thereof when the host vehicle is turning along a curve of a roadway.

* * * * *